United States Patent
Conrad et al.

(10) Patent No.: US 6,447,733 B1
(45) Date of Patent: *Sep. 10, 2002

(54) FLUID CONTACT CHAMBER

(75) Inventors: Wayne Ernest Conrad, Hampton; Helmut Gerhard Conrad, Oshawa; Richard Stanley Phillips, Courtice; Andrew Richard Henry Phillips, Oshawa, all of (CA)

(73) Assignee: T I Properties, Inc., Los Angeles, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/948,247

(22) Filed: Oct. 9, 1997

Related U.S. Application Data

(63) Continuation of application No. 08/636,880, filed on Apr. 23, 1996, now abandoned, which is a continuation of application No. 08/336,064, filed on Nov. 4, 1994, now abandoned.

(51) Int. Cl.[7] .............................. B06B 1/00; B01J 35/02
(52) U.S. Cl. .................... 422/128; 422/186.3; 422/211; 422/227; 422/228; 261/123; 261/126; 261/DIG. 42; 261/DIG. 48
(58) Field of Search ............................ 422/128, 186.14, 422/186.3, 211, 227, 228; 261/123, 126, DIG. 42, DIG. 48; 366/336, 337, 34; 210/748, 194, 209, 220

(56) References Cited

U.S. PATENT DOCUMENTS

| | | | | |
|---|---|---|---|---|
| 3,045,984 A | * | 7/1962 | Cochran | 259/4 |
| 3,347,303 A | * | 10/1967 | Herman | 158/36 |
| 4,028,246 A | * | 6/1977 | Lund et al. | 210/151 |
| 4,029,578 A | * | 6/1977 | Turk | 210/63 |
| 4,072,296 A | * | 2/1978 | Doom | 366/337 |
| 4,072,613 A | * | 2/1978 | Alig | 210/198 R |
| 4,118,313 A | * | 10/1978 | Hadamovsky et al. | 560/78 |
| 4,372,860 A | * | 2/1983 | Kaas | 210/748 |
| 5,091,118 A | * | 2/1992 | Burgher | 261/76 |
| 5,425,924 A | * | 6/1995 | Finley | 422/220 |

* cited by examiner

*Primary Examiner*—Nina Bhat
(74) *Attorney, Agent, or Firm*—Hale and Dorr LLP

(57) ABSTRACT

A fluid contactor is taught for mixing and reacting of fluids. Mixing is enhanced by providing a suitable residence time and suitable surface area contact by forming eddy flow within the fluid and thereby the formation of vortexes. Such a contactor does not require the use of mechanical mixers. The contact chamber of the present invention can enhance chemical modification by use of chemical modifiers such as ultraviolet lamps, by allowing the positioning of such modifiers adjacent the vortexes.

18 Claims, 4 Drawing Sheets

FLUID CONTACT CHAMBER

This application is a continuation-in-part, of application Ser. No. 08/636,880, filed Apr. 23, 1996, now abandoned which is a continuation of prior application Ser. No. 08/336,064 filed Nov. 4, 1994, now abandoned.

FIELD OF THE INVENTION

This invention is directed to a fluid contact chamber and, in particular, an fluid contact chamber for mixing and reacting fluids.

BACKGROUND OF THE INVENTION

Fluid contactors, such as those used in the mixing and transfer of gases into liquids, are known which provide suitable results by allowing sufficient time and surface area for contact between the fluids. However, the provision of sufficient residence time and mixing in such contactors creates various drawbacks such as the requirement for high energy inputs to effect mixing and/or increased chamber size and complexity to increase the residence time.

SUMMARY OF THE INVENTION

A fluid contact chamber has been invented which allows good contact time and mixing by use of turbulent flow, while maintaining a compact and simple chamber.

According to a broad aspect of the present invention there is provided a fluid contact chamber comprising a container for a first fluid, an inlet for introducing a flow of a second fluid, a means for directing the flow such that at least one eddy is formed and an outlet for passage of at least one of the first or second fluid.

DESCRIPTION OF THE INVENTION

A fluid contact chamber is provided which acts to mix fluids and allow reaction thereof, if desired. The chamber comprises a container for a first fluid and an inlet for introduction of a second fluid to the container. The second fluid is caused to flow through the first fluid by any suitable means such as, for example, by application of pressure or by differential density. The chamber further comprises a means for directing the flow of the second fluid such that a deviation in the flow, termed an eddy, is created which leads to the formation of a vortex.

Vortex action causes the second fluid to be dispersed and mixed within the first fluid. In addition, the concentric flow pattern of the vortex traps the second fluid within the first fluid to increase the residence time of the second fluid in the first fluid.

The means for directing the flow of the second fluid can be of any suitable form. For example, the means can comprise a pipe arrangement having a configuration which allows for eddy formation. In a preferred embodiment, the means comprises at least one baffle disposed within the container to direct the flow of the second fluid such that at least one eddy is formed. Preferably, a plurality of baffles are provided which extend in alternating directions to set up a serpentine flow path. Preferably the baffles extend substantially across the width of the container to prevent the flow from passing through the container without being acted upon by the baffles. Eddy formation can be caused by disposing the baffle in the flow path at a predetermined angle, or, alternatively, by providing a baffle having a predetermined shape. Such shape or angle is selected such that eddys are formed when the second fluid is acted upon by the baffle. As is known, the precise angle or shape selected will be dependant upon the viscosities of the fluid to be contacted and the rate of flow of the fluid to be introduced.

The chamber of the present invention allows for mixing of the first fluid without the use of mechanical mixers or pumping means, although such mechanical means can be used if desired.

Any suitable inlets and outlets can be provided to the container. For example, a pair of ports can be provided for introduction and removal of fluids. In such an embodiment, the first fluid is introduced to the chamber via a port which is also used to either introduce or allow removal of the second fluid. The second is used for removal of the unmixed portion of the second fluid, if the first port has been used for introduction of the second fluid, or introduction of the second fluid, if the first port is to be used for the removal of its unmixed portions. Once fluid contact is complete, the first fluid with a portion of the second fluid mixed therein is removed from the chamber via one of the ports.

In another embodiment, a plurality of inlet and outlet ports are provided. In another preferred embodiment, a counter current flow is set up in the chamber by introducing a flow of a first fluid which acts against the flow of the second fluid. In such an embodiment, the residence time of the second fluid in the first fluid is increased since the flow of the second fluid through the chamber is slowed.

In a further embodiment, the chamber is formed with an open top which acts as an outlet.

The ports are of any suitable type. In a preferred embodiment, a venturi tube is provided at each inlet port for passage of two fluids to be contacted.

If desired, the chamber of the present invention can be used to enhance the reaction of the fluids by providing means for chemical modification in association with the chamber. Such means are preferably positioned adjacent or in communication with the vortexes.

In an embodiment, catalysts are provided within the container. In a preferred embodiment, portions of the chamber such as the baffles have catalyst applied thereto and act as catalytic supports.

In another embodiment means for causing chemical reaction, such as a ultraviolet lamp or an ultrasonic emitter, is mounted in association with the chamber, and preferably in a position to modify directly the fluids in the eddy flow.

Portions of the chamber can be modified such as by roughening to promote precipitation of reaction products. Such modification is preferably positioned selectively within the container such that precipitation occurs out of the flow path of the second fluid, thereby avoiding blockage of the flow path.

To facilitate cleaning, recovery of reaction products and/or application of catalysts, the chamber is, in a preferred embodiment, able to be easily dismantled.

The chamber of the present invention can be formed either as an enclosed or an open chamber. In one embodiment, the chamber is open at its top and the baffles are attached to a removable insert which fits within the chamber.

BRIEF DESCRIPTION OF THE DRAWINGS

A further, detailed, description of the invention, briefly described above, will follow by reference to the following drawings of specific embodiments of the invention, which depict only typical embodiments of the invention and are therefore not to be considered limiting of its scope. In the drawings.

DETAILED DESCRIPTION OF THE INVENTION

Figure 1:
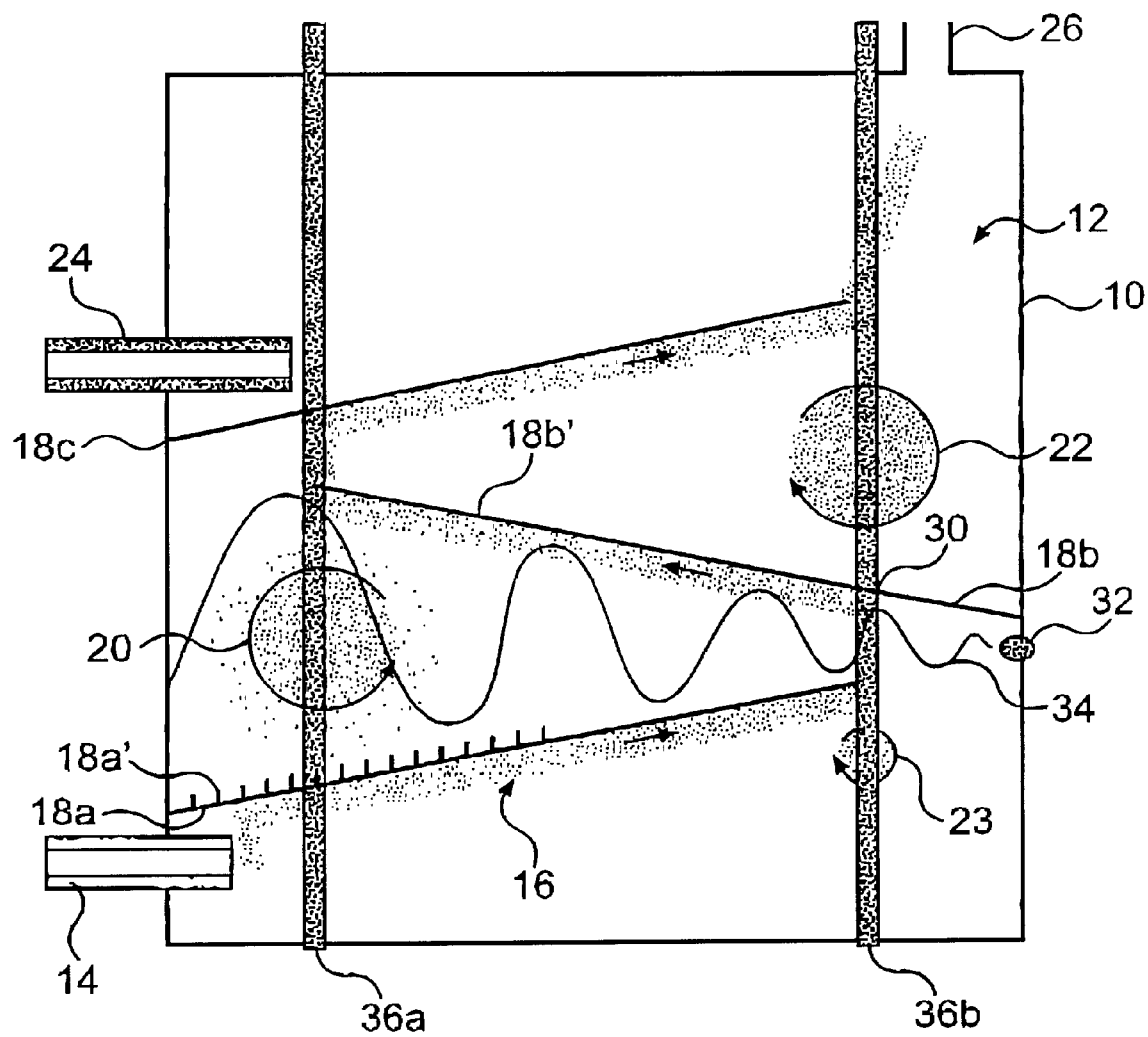
FIG. 1 shows a sectional view through an embodiment of a fluid contact chamber according to the present invention.

While vortexes have been illustrated in all flow patterns illustrated in the drawings, it is to be understood that the means for directing the flow of the introduced fluid, which have been illustrated as baffles, are disposed to direct the flow such that eddys are formed.

Referring to FIG. 1, a fluid contact chamber is shown comprising a container 10 for a first fluid 12 and an inlet 14 for introducing a second fluid 16 which flows through first fluid 12, as indicated by the arrows. A plurality of baffles 18a, 18b, 18c extend into container 10 to direct the flow of second fluid 16.

In the embodiment as shown, first fluid 12 is a liquid and second fluid 16 is a gas. Once fluid 16 is introduced into first fluid 12 through inlet 14, fluid 16 immediately begins to flow through fluid 12 due to differential density. Baffles 18a, 18b, 18c alternately extend from opposite sides of the chamber to direct the flow such that a generally serpentine flow path is set up. Baffles 18a, 18b, 18c are disposed in the container to direct the flow such that vortexes 20, 22 are set up in the flow. A smaller vortex 23 will be set up by action of baffle 18a.

A port 24 is provided in container 10 for passing first fluid 12 to container 10. An outlet 26 is provided for removing fluids which have risen to the upper portion of the chamber because of differential density.

To accommodate chemical reactions, various embodiments of the chamber are provided which accommodate, enhance or promote chemical reactions therein. Such embodiments are shown in FIG. 1. In an embodiment, a portion of the upper surface 18a' of baffle 18a is roughened to enhance precipitate formation on the surface of the baffle. Precipitate is removed by, for example, flushing and filtration to recover precipitate or recovery by means of a suitable solvent.

In another embodiment, catalyst 30 is applied to the surface 18b' of baffle 18b, adjacent vortex 22 to catalyze a reaction between first and second fluids.

Another embodiment provides an ultrasonic emitter 32 in the container. Positioning of emitter 32 is such that baffles 18a and 18b amplify the ultrasonic signal, indicated generally at 34, and direct the signal through vortex 20. A reflected signal (not shown) is directed by baffles 18b and 18c through vortex 22.

In a further embodiment, ultraviolet bulbs 36a, 36b are positioned in the container to emit ultraviolet radiation. Bulbs 36a, 36b are positioned adjacent vortexes, but out of the direct flow, within an encasement which is transparent to ultraviolet light.

The embodiments for enhancing, accommodating and promoting chemical reaction, as described, need not all be present in the same apparatus, as the presence of one or more may not be required for the particular mixing of fluids being undertaken. Alternately, the embodiments can all be present in the chamber at all times, but be only used as needed.

Figure 2:
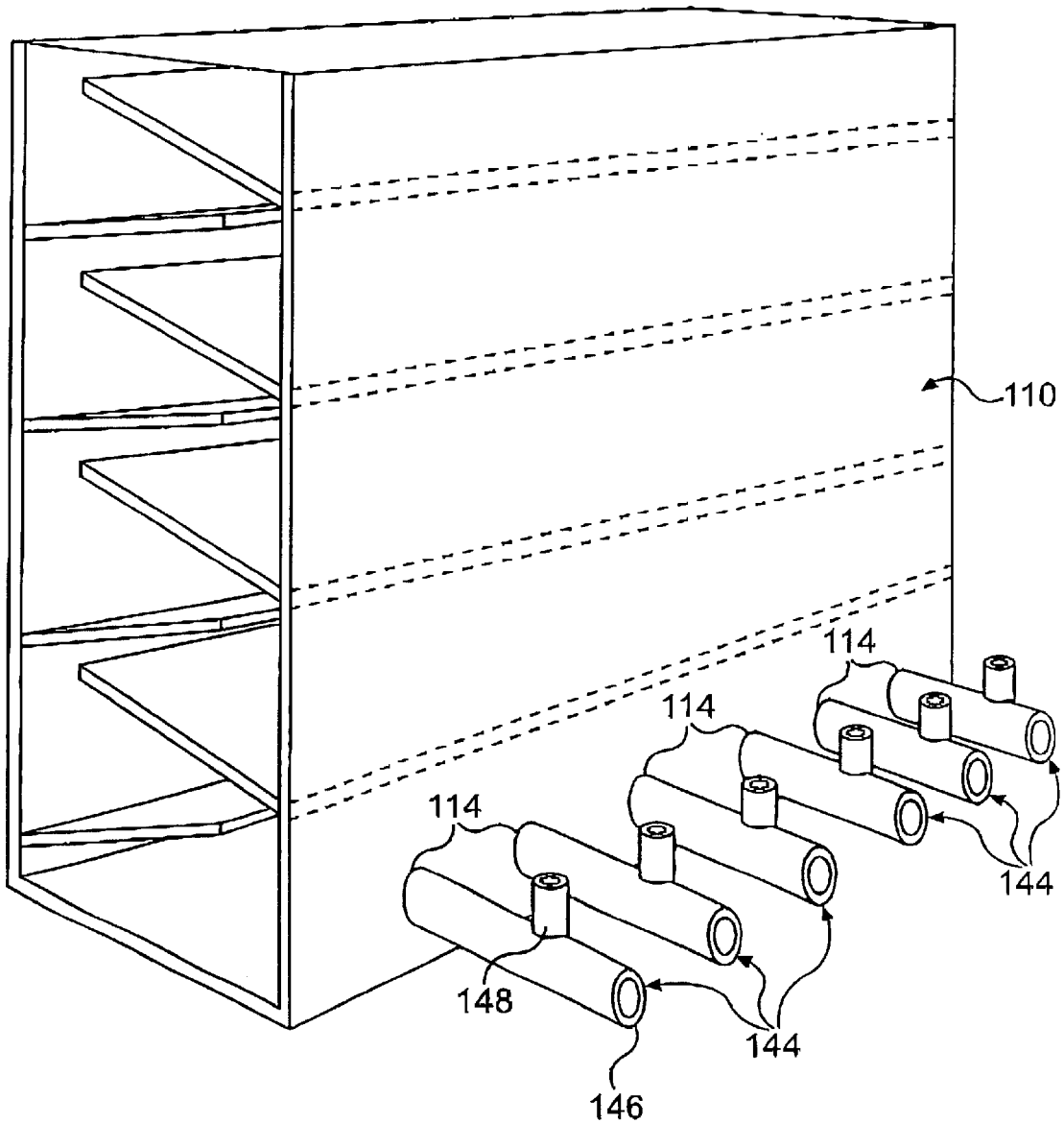
FIG. 2 shows a perspective view through another embodiment of a fluid contact chamber according to the present invention.

Referring to FIG. 2, a fluid contact chamber according to the present invention is shown comprising a container 110 having a plurality of inlet ports 114 thereto. Attached at each inlet is a venturi tube 144. Venturi tubes 144 allow the introduction of a first fluid through venturi inlet 146 which causes a second fluid to be drawn into the tube through aspirator 148. The first and second fluids mix in the tubes and are passed through inlets 114 into container 110. Container 110 is similar to container 10, except that it is shown with more baffles. For simplicity, the outlet ports and interior details are not shown.

Figure 3:
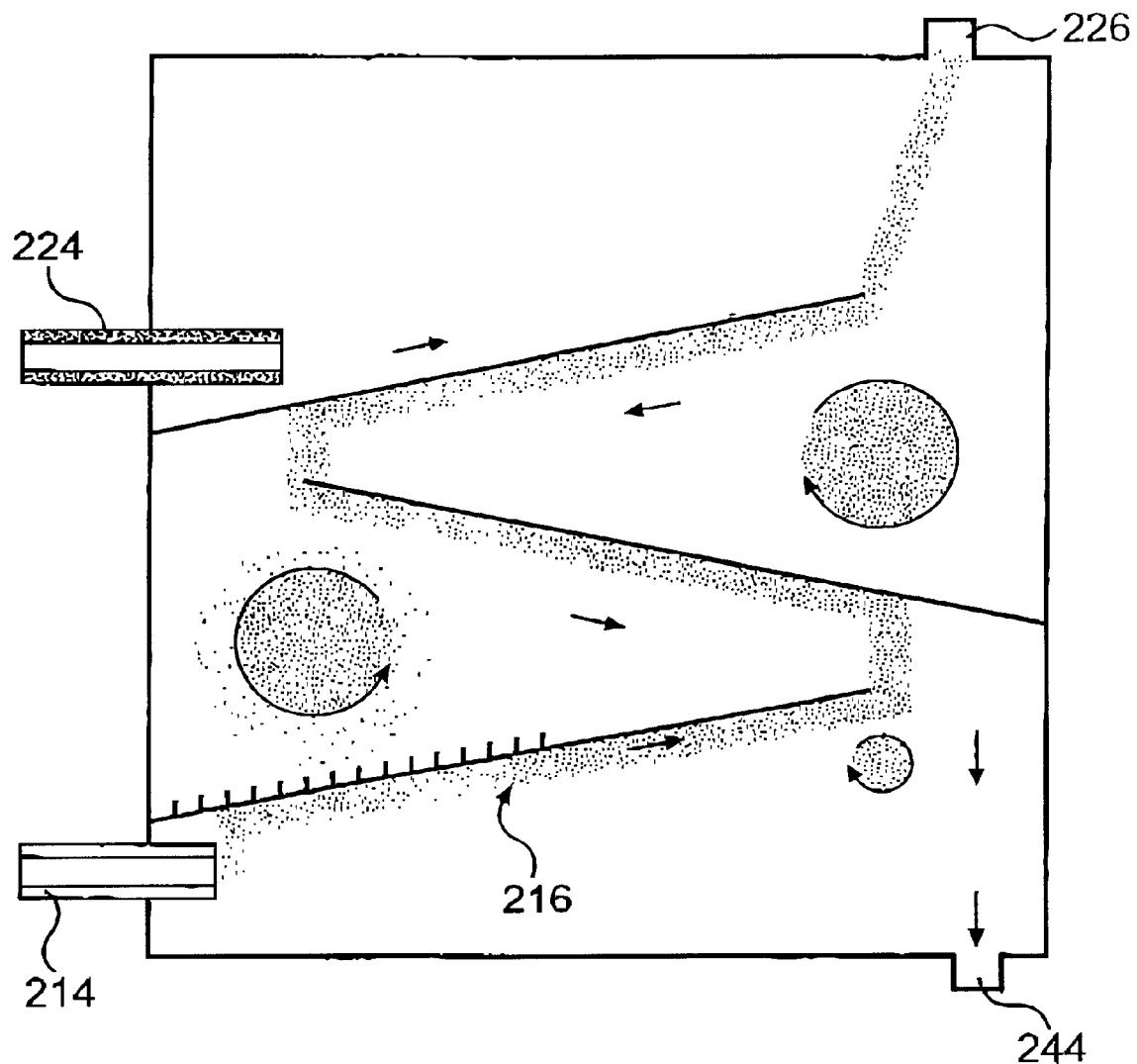
FIG. 3 shows a sectional view through a further embodiment of a fluid contact chamber according to the present invention; and, FIG. 4 shows a sectional view through another embodiment of a fluid contact chamber according to the present invention.

Referring to FIG. 3, there is shown a fluid contact chamber having a port 224 for providing a flow of a first fluid (solid arrows) and a port 244 for removing the first fluid. A second fluid 216 is provided through a port 214 and is removed through port 226. As such, the fluids are contacted and move through the chamber in counter current flow. Otherwise the chamber is as shown in the embodiment of FIG. 1.

Figure 4:
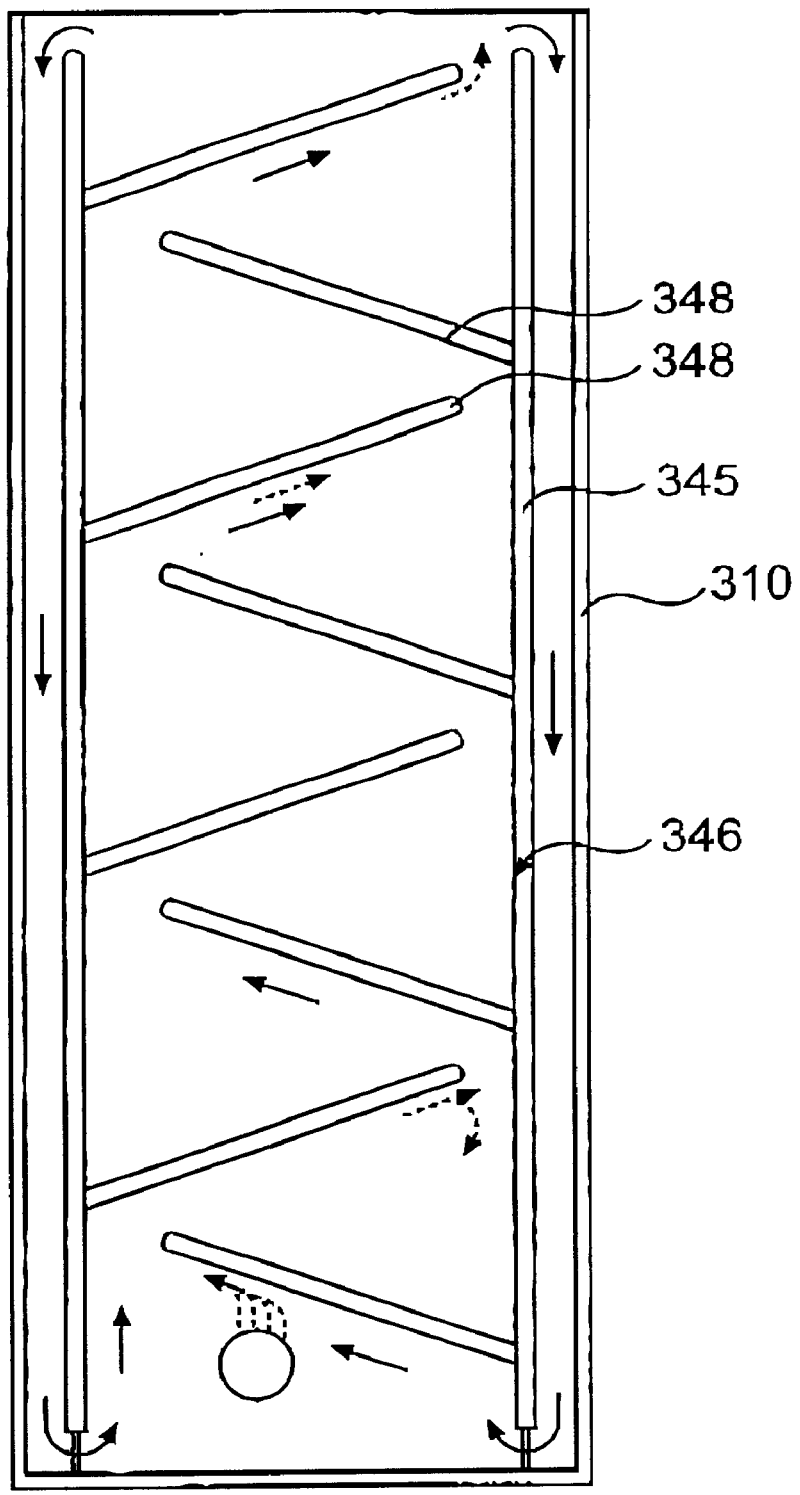

Referring to FIG. 4, there is shown a fluid contact chamber 310 formed without an upper cover. An insert 346 is in position in the chamber. Insert 346 has mounted on its wall portions 345, baffles 348 for directing the flow of fluid through the chamber and forming eddys in the flow. Insert 346 can be removed from chamber 310, if desired. Insert 346 is formed to fit within chamber 310 but is distanced therefrom to allow a flow of fluid, as indicated by solid arrows, between the chamber and the insert. A cyclical flow pattern can be generated as a first fluid (solid arrows) is pushed through the system by action of a second, introduced fluid (phantom arrows).

A particularly preferred use of chambers according to the present invention is of use in water treatment by contact of water with ozone. In such water treatment, water is fed to the container to a desired level and no further external pumping is applied. Ozone is introduced at a lower portion of the chamber and passes through the water by means of differential density. In the embodiment of FIG. 4, for example, the baffles are arranged at an angle of about 22° from horizontal such that eddies are formed as the ozone bubbles rise through the water. The baffles extend across 80% of the width of the chamber and are spaced such that there is an opening of ⅝" between adjacent baffles. To enhance the water treatment, ultraviolet bulbs and ultrasonic emitters are disposed in the container.

When such a chamber is used in water purification by contacting with ozone as discussed above, a further particularly preferred embodiment is to support on at least some of the baffles, titanium dioxide catalyst in the rutile form for removal of pesticides such as for example Malathion®, Parathion® or Dieldrin® from water.

It will be apparent that many other changes may be made to the illustrative embodiments, while falling within the scope of the invention and it is intended that all such changes be covered by the claims appended hereto.

What is claimed is:

1. A fluid contact chamber comprising:
   a container for a first fluid having first and second sides separated by a space therebetween;
   at least one inlet for introducing a flow of a second fluid;
   a means for directing the flow of said first fluid such that at least one eddy is formed, said means for directing comprising:

(a) at least one first baffle extending from said first side toward said second side, forming a first gap between said first baffle and said second side, said first baffle inclining upwardly at a first angle; and (b) at least one second baffle extending from said second side toward said first side, forming a second gap between said second baffle and said first side, and inclining upwardly at a second angle; and an outlet for passage of at least one of the first and second fluid.

2. The chamber of claim 1 further comprising:

a venturi tube for introducing the first fluid and the second fluid mounted at the at least one inlet.

3. The chamber of claim 1 wherein a catalyst is disposed in the container.

4. The chamber of claim 3, wherein said catalyst is titanium dioxide.

5. The chamber of claim 4 wherein the inlet is at a lower portion of the container.

6. The chamber of claim 1 wherein at least a portion of a surface of at least one of said at least one first and second baffles is modified to promote precipitation.

7. The chamber of claim 1 further comprising a means for chemical modification.

8. The chamber of claim 7 wherein the means for chemical modification comprises an ultrasonic emitter.

9. The chamber of claim 8 wherein each of an adjacent pair of said at least one first and second baffles of the means for directing the flow is disposed at an angle relative to the ultrasonic emitter such that an emitted ultrasonic signal is directed through the eddy.

10. The chamber of claim 7 wherein the means for chemical modification comprises a source of ultraviolet energy.

11. The chamber of claim 1 wherein at least one of said at least one first and second baffles extends across 80% of the width of the chamber.

12. The chamber of claim 1 wherein said means for directing further comprises an insert removable from the container and supporting at least one of said at least one first and second baffles.

13. The chamber of claim 12 wherein the insert is constructed and arranged to fit within the container and to be distanced therefrom to provide for a fluid flow between the container and the insert.

14. The chamber of claim 1 comprising an inlet and an outlet for each of the first fluid and the second fluid, the first fluid being introduced to the chamber to flow counter to the flow of the second fluid.

15. The chamber of claim 1 wherein said directing means defines a serpentine flow path through said chamber.

16. The chamber of claim 1 wherein said first angle is substantially equal to 22°.

17. The chamber of claim 1 wherein said second angle is substantially equal to 22°.

18. The chamber of claim 1 wherein an adjacent pair of said at least one first baffle and said at least one second baffle forms a third gap defining a truncated triangular cross-section.

* * * * *